United States Patent
Lam (10) Patent No.: US 7,594,228 B2
(45) Date of Patent: Sep. 22, 2009

(54) METHOD AND APPARATUS TO PERFORM TASK SCHEDULING

(76) Inventor: Siu H. Lam, 80 Heather Hill La., Woodcliff Lake, NJ (US) 07677

(*) Notice: Subject to any disclaimer, the term of this patent is extended or adjusted under 35 U.S.C. 154(b) by 1004 days.

(21) Appl. No.: 10/669,309

(22) Filed: Sep. 23, 2003

(65) Prior Publication Data

US 2005/0066328 A1    Mar. 24, 2005

(51) Int. Cl.
*G06F 9/46* (2006.01)
*G06F 15/16* (2006.01)
*G06F 15/173* (2006.01)
*G06F 15/00* (2006.01)

(52) U.S. Cl. ......... 718/102; 718/104; 718/105; 709/201; 709/202; 709/223; 709/226; 370/229; 370/230

(58) Field of Classification Search ......... 718/100–108; 370/431, 229–230; 709/201–226
See application file for complete search history.

(56) References Cited

U.S. PATENT DOCUMENTS

| | | | | |
|---|---|---|---|---|
| 5,437,032 A * | 7/1995 | Wolf et al. | | 718/103 |
| 5,964,829 A * | 10/1999 | Ozden et al. | | 718/102 |
| 6,104,721 A * | 8/2000 | Hsu | | 370/431 |
| 6,173,306 B1 * | 1/2001 | Raz et al. | | 718/102 |
| 6,223,205 B1 * | 4/2001 | Harchol-Balter et al. | | 718/105 |
| 6,338,130 B1 * | 1/2002 | Sinibaldi et al. | | 712/35 |
| 6,370,560 B1 * | 4/2002 | Robertazzi et al. | | 718/105 |
| 6,711,607 B1 * | 3/2004 | Goyal | | 709/203 |
| 7,178,147 B2 * | 2/2007 | Benhase et al. | | 718/104 |
| 7,203,943 B2 * | 4/2007 | Shaffer | | 718/104 |

* cited by examiner

*Primary Examiner*—Van H Nguyen
*Assistant Examiner*—Jennifer N To
(74) *Attorney, Agent, or Firm*—Blakely, Sokoloff, Taylor & Zafman LLP (57) ABSTRACT

A method and apparatus to perform task scheduling are described. Tasks are assigned by receiving a request to execute a task on one of multiprocessors. The type of task is determined for the task. A processor task value is used to select the proper processor and the task is assigned.

9 Claims, 4 Drawing Sheets

METHOD AND APPARATUS TO PERFORM TASK SCHEDULING

BACKGROUND

In many signal processing applications, an array of digital signal processors (DSP) may be used to achieve channel density. A channel requiring signal processing may be assigned to a particular DSP. There may be times, however, when the resources of the array are not used efficiently. Efficient use of resources may lead to improved performance and reduced costs. Consequently, there may be need for improvements in such techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
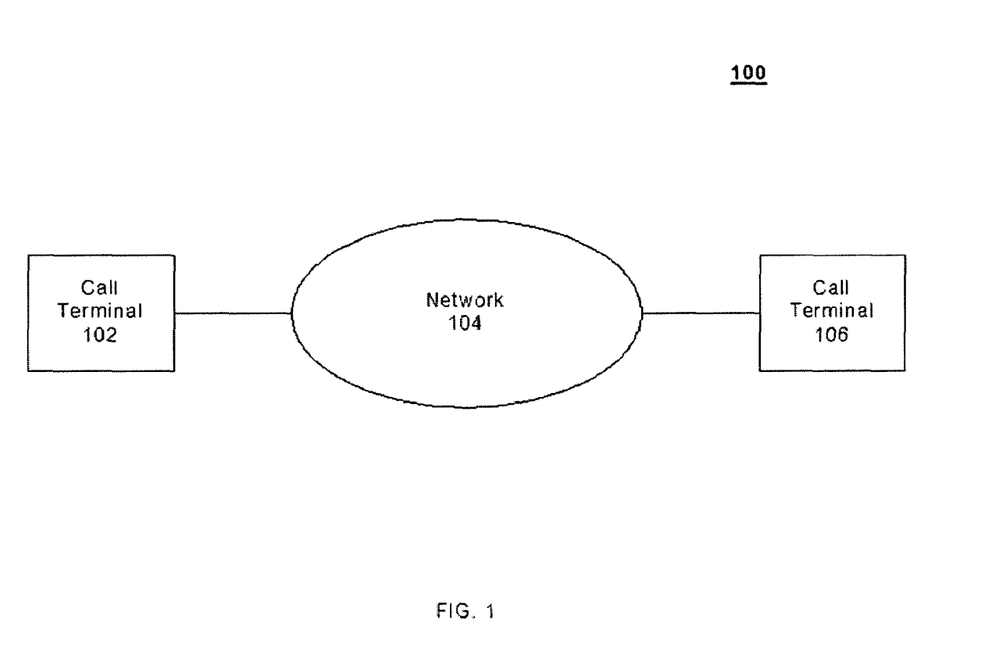
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. In one embodiment, system 100 may comprise, for example, a Voice Over Packet (VOP) system. A VOP system may communicate information traditionally carried by a circuit-switched system over a packet switched system. For example, a telephone call is typically completed using the Public Switched Telephone Network (PSTN). A VOP system may complete a telephone call over a packet network, such as the Internet, for example.

System 100 may comprise a plurality of network nodes. The term "network node" as used herein may refer to any node capable of communicating information in accordance with one or more protocols. Examples of network nodes may include a computer, server, switch, router, bridge, gateway, personal digital assistant, mobile device, call terminal and so forth. The term "protocol" as used herein may refer to a set of instructions to control how the information is communicated over the communications medium.

In one embodiment, system 100 may communicate various types of information between the various network nodes. For example, one type of information may comprise "media information." Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Another type of information may comprise "control information." Control information may refer to any data representing commands, instructions or control words meant for an automated system. For example, control information may be used to route media information through a network, or instruct a network node to process the media information in a predetermined manner.

In one embodiment, information may be communicated between the network nodes by a network, such as network 104. Network 104 may comprise one or more intermediate nodes and communications mediums. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

In one embodiment, for example, the network nodes may be connected by communications mediums comprising RF spectrum for a wireless network, such as a cellular or mobile system. In this case, the network nodes and/or networks shown in system 100 may further comprise the devices and interfaces to convert the packet signals carried from a wired communications medium to RF signals. Examples of such devices and interfaces may include omni-directional antennas and wireless RF transceivers. The embodiments are not limited in this context.

In one embodiment, the network nodes may communicate information to each other in the form of packets. A packet in this context may refer to a set of information of a limited length, with the length typically represented in terms of bits or bytes. An example of a packet length might be 1000 bytes. The packets may be communicated in accordance with one or more packet protocols. For example, in one embodiment the packet protocols may include one or more protocols, such as the Transmission Control Protocol (TCP) as defined by the Internet Engineering Task Force (IETF) standard 7, Request For Comment (RFC) 793, adopted in September, 1981; the User Datagram Protocol (UDP) as defined by IETF standard 6, RFC 768, adopted in August, 1980; and the Internet Protocol (IP) as defined by the IETF standard 5, RFC 791, adopted in September, 1981, all available from "www.ietf.org", although the embodiments are not limited to this context.

Referring again to FIG. 1, system 100 may comprise a first network node 102 and a second network node 106. First network node 102 and second network node 106 may be connected by a network 104. Although only a limited number of network nodes are shown as part of system 100 for purposes of clarity, it can be appreciated that any number of network nodes may be used and still fall within the scope of the embodiments. Further, it may also be appreciated that any number of intermediate nodes and communications mediums may exist between first network node 102 and second network node 106 in accordance with a given implementation.

In one embodiment, first network node 102 and second network node 106 may both comprise call terminals. A call terminal may comprise any device capable of communicating multimedia information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals using the media information from packets received from another call terminal. The embodiments are not limited in this context.

In one embodiment, network 104 may comprise elements for a circuit-switched network and/or a packet switched network. For example, the network nodes may communicate packets between each other via network 104 using one or more protocols. For example, the network nodes may communicate information in accordance with one or more protocols to communicate VOP packets representing audio, voice or tone information. In one embodiment, for example, network 104 may operate in accordance with the International Telecommunications Union (ITU) Recommendation H.323 titled "Packet-based Multimedia Communication Systems," published in November 2000 ("H.323 Specification"); the ITU Recommendation H.245 titled "Control Protocol For Multimedia Communication", published in July 2001 ("H.245 Specification"); the IETF Proposed Standard RFC 2543 titled "SIP: Session Initiation Protocol," published in March 1999 ("SIP Specification); IETF Proposed Standard RFC 2833 titled "RTP Payload for DTMF Digits, Telephony Tones and Telephony Signals," published in May 2000 ("RFC 2833 Specification"); IETF Proposed Standard RFC 1889 titled "RTP: A Transport Protocol For Real Time Applications," published in January 1996 ("RTP Specification"), all available from "www.ietf.org." Although specific examples are discussed herein, it may be appreciated that the embodiments are not limited in this context. Further, network 104 may also include circuit-switched technologies and appropriate interfaces to packet network technologies, and vice-versa, as desired for a particular implementation.

Figure 2:
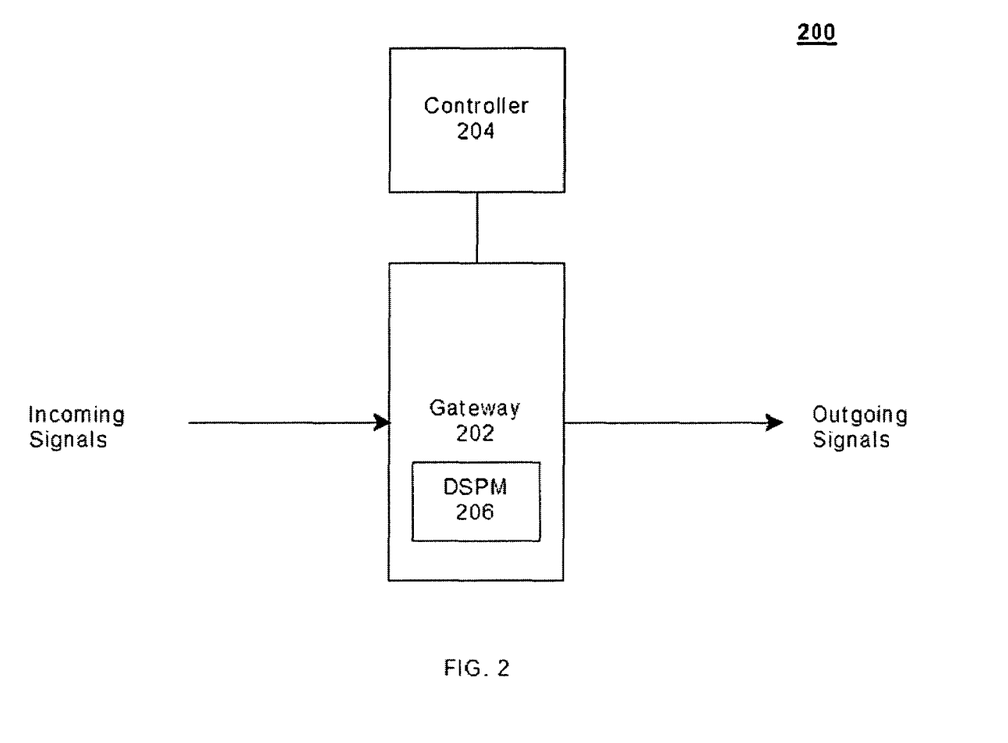
FIG. 2 may illustrate a network node in accordance with one embodiment.

FIG. 2 may illustrate a network node in accordance with one embodiment. FIG. 2 may illustrate a network node 200. In one embodiment, network node 200 may be representative of, for example, a VOP network node. VOP network node 200 may comprise one or more modules. Although portions of VOP network node 200 may be described in terms of "modules" for clarity, one or more circuits, components, registers, processors, software subroutines, or any combination thereof could be substituted for one, several, or all of the modules.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented using software executed by a processor. The processor may be a general-purpose or dedicated processor, such as a processor made by Intel® Corporation, for example. The software may comprise computer program code segments, programming logic, instructions or data. The software may be stored on a medium accessible by a machine, computer or other processing system. Examples of acceptable mediums may include computer-readable mediums such as read-only memory (ROM), random-access memory (RAM), Programmable ROM (PROM), Erasable PROM (EPROM), magnetic disk, optical disk, and so forth. In one embodiment, the medium may store programming instructions in a compressed and/or encrypted format, as well as instructions that may have to be compiled or installed by an installer before being executed by the processor. In another example, one embodiment may be implemented as dedicated hardware, such as an Application Specific Integrated Circuit (ASIC), Programmable Logic Device (PLD) or DSP and accompanying hardware structures. In yet another example, one embodiment may be implemented by any combination of programmed general-purpose computer components and custom hardware components. The embodiments are not limited in this context.

In one embodiment, VOP network node 200 may comprise part of, for example, system 100 shown in FIG. 1. For example, VOP network node 200 may comprise a network node that is part of network 104, or call terminals 102 and 106. VOP network node 200 may comprise VOP elements 202 and 204. Element 202 may further include element 206.

In one embodiment, element 202 of VOP network node 200 may comprise, for example, a media gateway. In general, a media gateway may be a network node that serves as an entrance to another network. In enterprises, for example, the media gateway may route traffic between network nodes within the enterprise network and network nodes outside the enterprise network. The media gateway may be any device, such as a computer, circuit switch, IP gateway, or channel bank that converts data from the format required for one type of network to the format required for another. The media gateway may terminate channels from a circuit-switched network such as the PSTN, as well as streaming media from a packet-switched network such as RTP streams in an IP network. Data input could be audio, video, or real-time multi-point communications, which the media gateway would handle simultaneously.

In one embodiment, gateway 202 may operate to convert a conventional telephony call to a packet telephony call or VOP call. Gateway 202 may receive signals from a circuit-switched network such as the PSTN and convert them to packet voice signals. An example of signals communicated via a circuit-switched network may comprise Pulse Code Modulation (PCM) signals. The conversion to packets may be made in accordance with, for example, any number of protocols, such as the RTP Specification and others. Gateway 202 may communicate both call control packets and packet voice signals through other components of VOP network node 200 until the packets reach their intended destination, e.g., a call terminal connected to VOP network node 200.

In one embodiment, element 204 of VOP network node 200 may comprise a media gateway controller. A media gateway controller may comprise any open application program interface (API) software used to bridge a circuit-switched network such as the PSTN with a VOP network by separating the call control functions of a telephone call from the transport layer implemented by the media gateway, such a media gateway 202, for example. In one embodiment, media gateway controller 204 may perform call control functions, such as address translation, admission control, call control signaling, call authorization, call management and so forth in accordance with any appropriate call processing protocol, such as H.323 and SIP, for example. Controller 204 may communicate with gateway 202 via call control packets to perform such call control functions. In one embodiment, media gateway controller 204 may provide address and routing information to communicate packets through VOP network node 200 to the destination call terminal, such as call terminal 106.

In one embodiment, element 206 of media gateway 202 may comprise a DSP module. DSP module 206 may further comprise an array of processors such as DSPs, and a task scheduler for the array of DSPs. DSP module 206 may be used to support signal processing applications, such as those performed by media gateway 202. The DSP module may be used to achieve channel density. A channel managed by media gateway 202 may require signal processing. The channel may be assigned to one DSP of the DSP array. Examples of signal processing may include voice coding and decoding tasks, although the embodiments are not limited in this respect.

In one embodiment, DSP module 206 may be used to increase overall resource utilization for gateway 202, without significantly introducing additional processing overhead. The resource requirement for a particular signal processing task can vary considerably, and therefore have varying amounts of impact on system resources, such as processing power and memory. DSP module 206 may assign tasks to the DSP array in a manner that reduces wasted resources, and improves the likelihood that additional channels can be serviced by the DSP array. DSP module 206 may be discussed in more detail with reference to FIG. 3.

Figure 3:
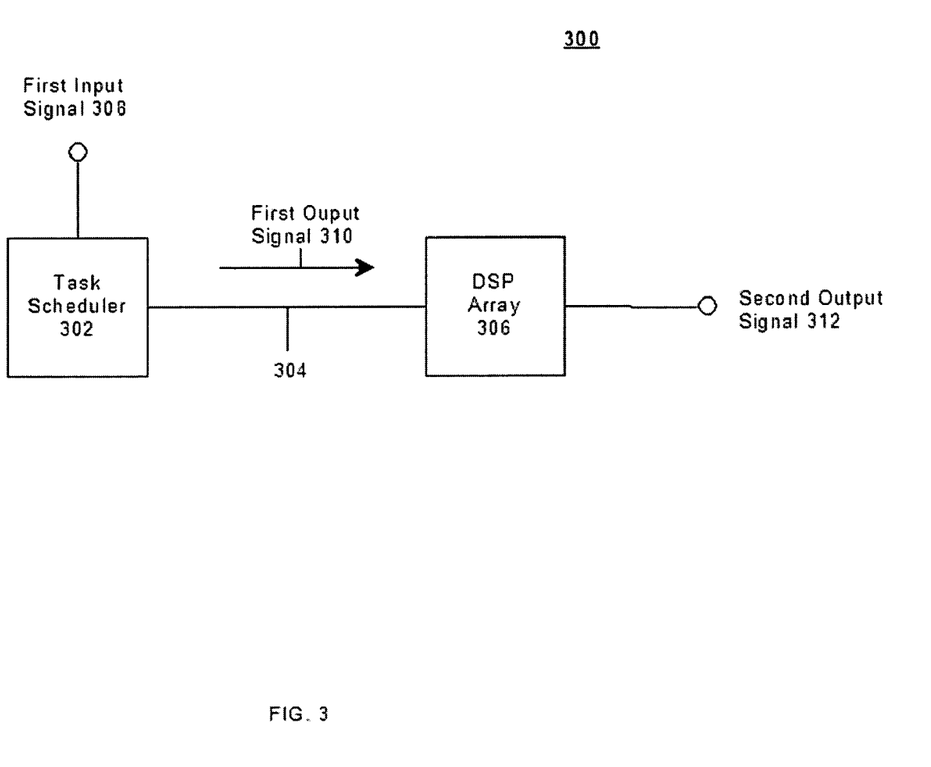
FIG. 3 illustrates a block diagram of a DSP module in accordance with one embodiment.

FIG. 3 illustrates a block diagram of a DSP module in accordance with one embodiment. FIG. 3 may illustrate a DSP module 300. DSP module 300 may be representative of, for example, DSP module 206 used by media gateway 202. In one embodiment, DSP module 300 may comprise a task scheduler 302 and a DSP array 306. Although DSP module 300 may describe a limited number of elements for purposes of clarity, it may be appreciated that any number of additional elements may be added and still fall within the scope of the embodiments.

In one embodiment, DSP array 306 may comprise a plurality of processing systems, such as DSPs and their accompanying architecture. For example, DSP array 306 may comprise an array of N DSPs, with each DSP having a number of resource units. The resource units may be used to represent the processing power for the DSP. In one embodiment, for example, each resource unit may represent one Million Instructions Per Second (MIPS). Therefore, a DSP having a resource unit of 100 may operate at a processing speed of 100 MIPS. The embodiments are not limited in this context.

In one embodiment, task scheduler 302 may perform task scheduling for DSP array 306. Task scheduler 302 may receive a first input signal 308 representing a request to execute a task on one DSP of DSP array 306. Task scheduler 302 may select a DSP to execute the task in accordance with a scheduling algorithm. Task scheduler 302 may then assign the task to the selected DSP via first output signal 310. The selected DSP of DSP array 306 may process the task, and provide a requested output via second output signal 312. This may be repeated for any number of task requests received by task scheduler 302. Further, task requests may be scheduled in parallel using multiple task schedulers properly configured to communicate the appropriate control and management signals, such as the current state of each scheduling algorithm and DSP array 306, for example. The operation of DSP module 300 may be discussed in more detail with reference to FIG. 4.

The operations of systems 100-300 may be further described with reference to FIG. 4 and accompanying examples. Although FIG. 4 as presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 4:
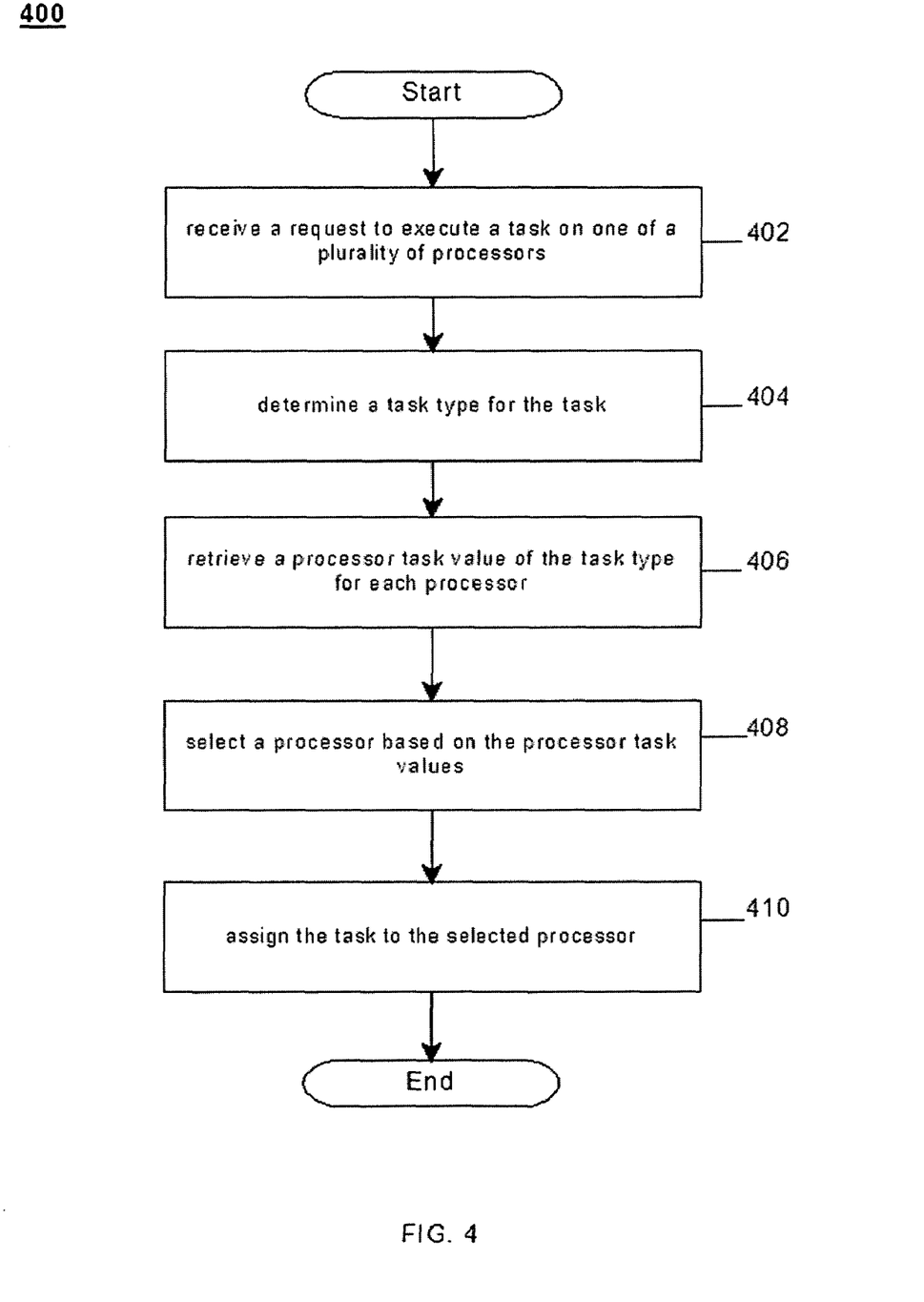
FIG. 4 illustrates a programming logic for a DSP module in accordance with one embodiment.

FIG. 4 illustrates a programming logic 400 for a network node in accordance with one embodiment. In one embodiment, for example, programming logic may be implemented as part of DSP module 300. Programming logic 400 may represent a programming logic to assign tasks to a DSP array, such as DSP array 306. As shown in programming logic 400, a request to execute a task on one of a plurality of processors may be received at block 402. A determination may be made as to the task type for the task at block 404. A processor task value of the task type for each processor may be retrieved at block 406. A processor may be selected based on the processor task values at block 408. The task may be assigned to the selected processor at block 410.

In one embodiment, the term "processor task value" may represent a number of other task types affected by assigning the task to a particular processor. More particularly, the processor task value may represent a number of other possible task type assignments that will not be additionally reduced relative to the other task types if the incoming task is assigned to a given processor. As used herein the term "task type" may refer to a set of generic characteristics for a particular class of tasks. For example, the signal processing tasks for a particular voice coder/decoder ("codec") may be grouped together as a single task type.

In one embodiment, the processor task values for each task type and each processor may be updated periodically. The update may be performed before or after a new task event has occurred. A task event may comprise, for example, an incoming task request to be assigned by task scheduler 302. The processor task values and associated data may be stored in a processor task table for use by task scheduler 302, for example.

The processor task values may be updated for any number of task types and any number of processors. In one embodiment, the update operations may be described with reference to two task types for purposes of clarity, although it may be appreciated that these techniques may be extended to work with any number of task types for a given implementation.

In one embodiment, the processor task values for two task types per processor may be updated. A first resource cost value for a first task type may be retrieved. A second resource cost value for a second task type may also be retrieved. A modulo of the first resource cost value divided by the second resource cost value may be generated to form a first relative resource value for the first task type relative to said second task type. A modulo of the second resource cost value divided by the first resource cost value may be generated to form a second relative resource value for the second task type relative to the first task type. A remaining resource value may be determined for the given processor. A modulo of the remaining resource value divided by the first resource cost value may be generated to form a first spare resource value for the first task type. A modulo of the remaining resource value divided by the second resource cost value may be generated to form a second spare resource value for the second task type. The processor task value for the first task type may be incremented by some amount (e.g., 1) if the first relative resource value is greater than the second spare resource value. The processor task value for the second task type may be incremented by some amount (e.g., 1) if the second relative resource value is greater than the first spare resource value.

In one embodiment, a processor may be selected using the processor task values. For example, the processor task values may be compared to each other to determine the processor having the highest processor task value. The processor having the highest processor task value may then be selected to execute the task.

The operation of systems 100-300, and the programming logic shown in FIG. 4, may be better understood by way of example. Consider the example of an array of N DSPs, each with 100 resource units. Assume each resource unit represents one MIPS. The N DSPs are to be pooled to provide the necessary processing for a plurality of communications channels carried by media gateway 202, for example.

The maximum number of each task type that may be executed by each processor may vary according to a number of factors, such as the number of task types, the resource units allocated per task, the resource units allocated per processor, and so forth. In this example, assume N=4. Further, assume there are 3 task types that can be chosen to be performed for a particular channel, on a real-time basis. Thus processors 1-N may each be assigned multiple tasks, with each task corresponding to a task type 1, task type 2 and task type 3. Each task type may represent tasks for a different voice codec, for example, and therefore use a different number of resources units. For each task, for example, task type 1 may use 3 resource units, task type 2 may use 17 resource units, and task type 3 may use 21 resource units.

The capacity of each processor using the above assumed values may be summarized in Table 1.

TABLE 1

| Task | Resource Cost | Capacity of each processor | Spare resource |
|------|---------------|----------------------------|----------------|
| #1   | 3             | 33 (33 × 3 = 99)           | 1              |
| #2   | 17            | 5 (5 × 17 = 85)            | 15             |
| #3   | 21            | 4 (4 × 21 = 84)            | 16             |

As shown in Table 1, task type 1 has a resource cost value of 3. Since each processor has 100 resource units, the maximum number of task type 1 tasks that may be implemented by a processor N is 33, leaving a remainder or spare resource units of 1. Similarly, the maximum number of task type 2 tasks that may be implemented by processor N is 5, leaving 15 spare resource units. The maximum number of task type 3 tasks that may be implemented by processor N is 4, leaving 16 spare resource units. As illustrated by Table 1, this type of task assignment to processors from DSP array 306 may result in significant wasted resources.

Other scheduling algorithms may also result in significant wasted resources. For example, round robin scheduling simply assigns each incoming task to the next available processor in sequential fashion. This may also cause a relatively large number of unusable spare resource units, as demonstrated in Table 2.

TABLE 2

| Processor | Task#1       | Task#2       | Task#4       | Spare resource |
|-----------|--------------|--------------|--------------|----------------|
| 1         | 17 × 3 = 51  | 2 × 17 = 34  | none         | 15             |
| 2         | 14 × 3 = 42  | none         | 2 × 21 = 42  | 16             |
| 3         | 16 × 3 = 48  | 1 × 17 = 17  | 1 × 21 = 21  | 14             |
| 4         | none         | none         | 4 × 21 = 84  | 16             |

Table 2 may illustrate the results of inefficient scheduling algorithms such as round robin scheduling, for example. As shown in Table 2, incoming tasks of varying task types are assigned to processors 1-4, resulting in spare resource units of 15, 16, 14 and 16, respectively. If an additional task request arrives for a task type having a greater resource cost than the available spare resource units for each processor, then the additional task may not be accommodated by the entire DSP array. This may occur even though there may be a sufficient number of total resource units (i.e., 61) scattered across the four processors.

To avoid these and other problems, task scheduler 302 may control which tasks are assigned to which processors in accordance with a scheduling algorithm. The scheduling algorithm may be designed to assign incoming tasks requests in a manner that increases the number of task types that may be executed by DSP array 306. This may reduce wasted resources and improve the likelihood that additional channels may be setup for media gateway 202.

In one embodiment, for example, task scheduler 302 may receive a request to execute a task on one of the processors from DSP array 306. Task scheduler 302 may determine a task type for the task. Task scheduler 302 may then retrieve a processor task value for the task type for each processor. Task scheduler 302 may select a processor based on the processor task values retrieved for each processor. Task scheduler 302 may assign the task to the selected processor to execute the task.

The processing task score may be kept for each task type on each processor. The processing task score may track the number of resource units available for a task type without affecting the number of possible assignments for the task type. In one embodiment, the processor task values may be stored in a processor task table. The processor task values for each task type and each processor may be updated before or after a task event has occurred. The updated processor task values may be stored in the processor task table, and thereby be available for retrieval by task scheduler 302 when making a new task assignment.

The type of information used to generate and update the processing task scores for each task type and each processor may be summarized using Table 3.

TABLE 3

| Resource | Task #1 | Task #2 | Task #3 |
|----------|---------|---------|---------|
| Cost Value | 3 | 17 | 21 |
| Relative Resource Value: Resource requirement modulo resource requirement of other tasks (pre-calculated) | wrt Task 2: 3<br>wrt Task 3: 3 | wrt Task 1: 2<br>wrt Task 3: 17 | wrt Task 1: 0<br>wrt Task 2: 4 |
| Remaining Resource Value (e.g., 17 units used for Task #2) | 83 | 83 | 83 |
| Spare Resource Value (e.g., resource units with respect to current task out of 100) | (83 mod 3) = 2 | (83 mod 17) = 15 | (83 mod 21) = 20 |
| Task #1 Relative Resource Value > Spare Resource Value of other tasks? | Not applicable | (3 > 15?) No | (3 > 20?) No |

TABLE 3-continued

| Resource | Task #1 | Task #2 | Task #3 |
| --- | --- | --- | --- |
| Processor Task Value for Task #1 for this processor | (Number of negative entries above) 2 | | |
| Task #2 Relative Resource Value > Spare Resource Value of other tasks? | (2 > 2?) No | Not applicable | (17 > 20?) No |
| Processor Task Value for Task #2 for this processor | (Number of negative entries above) 2 | | |
| Task #3 Relative Resource Value > Spare Resource Value of other tasks? | (0 > 2?) No | (4 > 15?) No | Not applicable |
| Processor Task Value for Task #3 for this processor | (Number of negative entries above) 2 | | |

The values summarized in Table 3 are those for a first processor after a single task of task type 2 has been assigned to the first processor.

As shown in Table 3, task type 1 may have various resource cost values indicating the number of resource units needed to execute a task of a particular task type. For example, task type 1 may have a first resource cost value of 3, task type 2 may have a second resource cost value of 17, and task type 3 may have a third resource cost value of 21. The resource cost values for the task types are typically static, and therefore may be assigned during the design of the scheduling algorithm and initialization of task scheduler 302, for example.

The resource cost values may be used to calculate a plurality of relative resource values for each task type, with each relative resource value corresponding to the other task types. For example, task type 1 may have a relative resource value of 3 with respect to task type 2, and a relative resource value of 3 with respect to task type 3. The relative resource values may be obtained using modular arithmetic. Modular arithmetic deals with the remainders that result from division. For example, a relative resource value may be found by dividing the resource cost value of the current task type with the resource cost value of the relative task type, and determining the remainder. For example, task type 2 has a relative resource value of 2 with respect to task type 1. This may be obtained by taking 17/3, which is 5, and leaving a remainder of 2. This may also be represented as (17 mod 3), which results in 2. Similar to the resource cost values, the relative resource values are typically static and therefore may be pre-calculated and stored in the processor task table during initialization, for example.

Once the relative resource values are determined, a remaining resource value may be determined for a given processor. The remaining resource value may represent a number of unused resource units remaining for a given processor. As shown in Table 3, the first processor has 100 resource units initially, and has been previously assigned a task of task type 2, which consumes 17 resource units. Therefore the first processor has a remaining resource value of 83 (i.e., 100−17=83).

The remaining resource value and resource cost value for each task type may be used to determine a spare resource value. The spare resource value may also be determined using modular arithmetic. For example, the spare resource value for task type 1 may be (83 mod 3) resulting in 2. The spare resource value for task type 2 may be (83 mod 17) resulting in 15. The spare resource value for task type 3 may be (83 mod 21) resulting in 20.

The processor task value for a given task type may be derived using the relative resource values of the given task type and the spare resource values for the other task types, and summing the results. For example, the processor task score for task type 1 may be found by comparing its relative resource values for task types 2 and 3 with the spare resource values for task types 2 and 3, respectively. If the comparison is negative, the processor task score may be incremented by some amount, such as one (1). Returning to the example shown in Table 3, the task type 1 relative resource values for task types 2 and 3 are the same (i.e., 3). The spare resource value for task type 2 is 15. A determination is made as to whether 3>15, which in this case is a negative result. The processor task score for task type 1 may be incremented from 0 to 1. Similarly, the spare resource value for task type 3 is 20. A determination is made as to whether 3>20, which in this case is also a negative result. The processor task value for task type 1 may be incremented from 1 to 2. Therefore, the processor task value for task type 1 comprises a value of 2. This same process may be repeated for the other task types, to determine their respective processor task values.

The update process may also be performed for processor N. The results may be shown in Table 4.

TABLE 4

| | Task #1 | Task #2 | Task #3 |
| --- | --- | --- | --- |
| Resource Cost Value | 3 | 17 | 21 |
| Relative Resource Value: Resource requirement modulo resource requirement of other tasks (pre-calculated) | wrt Task 2: 3 wrt Task 3: 3 | wrt Task 1: 2 wrt Task 3: 17 | wrt Task 1: 0 wrt Task 2: 4 |
| Remaining Resource Value (no tasks assigned) | 100 | 100 | 100 |
| Spare Resource Value (e.g., resource units with respect to current task out of 100) | (100 mod 3) = 1 | (100 mod 17) = 15 | (100 mod 21) = 16 |
| Task #1 Relative Resource Value > Spare Resource Value of other tasks? | Not applicable | (3 > 15?) No | (3 > 16?) No |
| Processor Task Value for Task #1 for this processor | (Number of negative entries above) 2 | | |
| Task #2 Relative Resource Value > Spare Resource Value of other tasks? | (2 > 1?) Yes | Not applicable | (17 > 16?) Yes |
| Processor Task Value for Task #2 for this processor | (Number of negative entries above) 0 | | |
| Task #3 Relative Resource Value > Spare Resource Value of other tasks? | (0 > 1?) No | (4 > 15?) No | Not applicable |
| Processor Task Value for Task #3 for this processor | (Number of negative entries above) 2 | | |

When a Task request comes in, task scheduler 302 will assign the task to the processor with the highest processor task value for that task type. If all the processor task values are the same, the selection can fall back to a secondary decision mechanism, such as a round robin algorithm.

Returning to our example, once the processor task table has been updated, task scheduler 302 may use the processor task values for each task type to select a processor to execute an incoming task. Task scheduler 302 may determine that the incoming task request is for a task type 2, for example. Task scheduler 302 may retrieve the processor task value for task type 2 from the first processor, which is 2. Task scheduler 302 may retrieve the processor task value for task type 2 from the N processor, which is 0. Task scheduler 302 may take the highest processor task value for task type 2, and assign the incoming task to the associated processor. In this example, the incoming task type 2 may be assigned to the first processor, since its processor task value for task type 2 is 2 versus 0 for processor N.

As illustrate in the example above, if task scheduler 302 receives a task type 2 request, task scheduler 302 will assign the task type 2 task to the first processor. This may occur since on a comparison basis, assigning it to processor N will cause the number of available assignments for task types 2 and 3 to be reduced by 1.

As task requests are being assigned or de-assigned, the spare resource value counts may be updated for each task type by subtracting the relative resource values allocated by the new assignment, or adding if the resource is released. This may be performed in an incremental modulo fashion with respect to the relative resource value of the associated task type, i.e., the amount subtracted or added is the resource units of the task modulo the resource units of the other tasks. Since the relative resource values of each task type is known in advance, these modulo operations can be pre-computed, thereby simplifying runtime requirements. If the result is less than 0, the resource requirement is added to the result. If the result is greater than the resource requirement, the resource requirement is subtracted from the result.

If more than one resource type is needed to be evaluated, the scores of different criterions can be added together to provide a composite score. An example of such a resource type may include memory usage in addition to MIPS usage distribution. The different criterions may be weighted as appropriate for a desired implementation.

While certain features of the embodiments have been illustrated as described herein, many modifications, substitutions, changes and equivalents will now occur to those skilled in the art. It is, therefore, to be understood that the appended claims are intended to cover all such modifications and changes as fall within the true spirit of the embodiments.

The invention claimed is:

1. A method to assign tasks, comprising:
receiving a request to execute a task on one of a plurality of processors;
determining a task type for said task;
retrieving a processor task value of said task type for each processor, said processor task value representing a number of other task types affected by assigning said task to a processor;
selecting a processor from said plurality of processors based on said processor task values; and
assigning said task to said selected processor; and
updating said processor task values for each task type and each processor, wherein said updating comprises:
retrieving a first resource cost value for a first task type;
retrieving a second resource cost value for a second task type;
generating a modulo of said first resource cost value divided by said second resource cost value to form a first relative resource value for said first task type relative to said second task type;
determining a remaining resource value for said processor;
generating a modulo of said remaining resource value divided by said second resource cost value to form a second spare resource value for said second task type;
comparing said first relative resource value to said second spare resource value; and
updating said processor task value for said first task type in accordance with said comparison.

2. The method of claim 1, wherein said processor task value for said first task type is incremented by one if said first relative resource value is less than said second spare resource value.

3. The method of claim 1,
wherein said processor task value for said second task type is incremented if said second relative resource value is greater than said first spare resource value.

4. The method of claim 1, wherein said selecting comprises:
comparing said processor task values for said processors; and
selecting a processor having a highest processor task value.

5. A method to assign tasks, comprising:
receiving a request to execute a task on one of a plurality of processors;
determining a task type for said task;
retrieving a processor task value of said task type for each processor, said processor task value representing a number of other task types affected by assigning said task to a processor;
selecting a processor from said plurality of processors based on said processor task values; and
assigning said task to said selected processor; and
updating said processor task values for each task type and each processor, wherein said updating comprises:
retrieving a first resource cost value for a first task type;
retrieving a second resource cost value for a second task type;
generating a modulo of said second resource cost value divided by said first resource cost value to form a second relative resource value for said second task type relative to said first task type;
determining a remaining resource value for said processor;
generating a modulo of said remaining resource value divided by said first resource cost value to form a first spare resource value for said first task type;
comparing said second relative resource value to said first spare resource value; and
updating said processor task value for said second task type in accordance with said comparison.

6. The method of claim 5, wherein said processor task value for said second task type is incremented by one if said second relative resource value is less than said first spare resource value.

7. An article, comprising:
a storage medium;
said storage medium including stored instructions that, when executed by a processor, result in assigning tasks by receiving a request to execute a task on one of a plurality of processors, determining a task type for said task, retrieving a processor task value of said task type for each processor, selecting a processor from said plurality of processors based on said processor task values, assigning said task to said selected processor, said processor task value representing a number of other task types affected by assigning said task to said processor and updating said processor task values for each task type and each processor, wherein the stored instructions, when executed by a processor, further result in said updating by retrieving a first resource cost value for a first task type, retrieving a second resource cost value for a second task type, generating a modulo of said first resource cost value divided by said second resource cost value to form a first relative resource value for said first task type relative to said second task type, determining a remaining resource value for said processor, generating a modulo of said remaining resource value divided by said second resource cost value to form a second spare resource value for said second task type, comparing said first relative resource value to said second spare resource value, and updating said processor task value for said first task type in accordance with said comparison.

8. The article of claim 7, wherein the stored instructions, when executed by a processor, further result in said updating by incrementing said processor task value for said second task type if said second relative resource value is greater than said first spare resource value.

9. The article of claim 7, wherein the stored instructions, when executed by a processor, further result in said selecting by comparing said processor task values for said processors, and selecting a processor having a highest processor task value.

* * * * *